US011656746B2

United States Patent
Figueroa

(10) Patent No.: US 11,656,746 B2
(45) Date of Patent: May 23, 2023

(54) INTERCEPTED LOADING OF WEB APPLICATIONS

(71) Applicant: Citrix Systems, Inc., Fort Lauderdale, FL (US)

(72) Inventor: Javier Alejandro Figueroa, Miramar, FL (US)

(*) Notice: Subject to any disclaimer, the term of this patent is extended or adjusted under 35 U.S.C. 154(b) by 84 days.

(21) Appl. No.: 16/685,302

(22) Filed: Nov. 15, 2019

(65) Prior Publication Data
US 2020/0089508 A1    Mar. 19, 2020

Related U.S. Application Data

(63) Continuation of application No. 15/806,417, filed on Nov. 8, 2017, now Pat. No. 10,528,361.

(51) Int. Cl.
  *G06F 3/04842* (2022.01)
  *G06F 9/445* (2018.01)
  *H04L 67/02* (2022.01)
  *G06F 40/143* (2020.01)
  *H04L 67/75* (2022.01)

(52) U.S. Cl.
  CPC .......... *G06F 3/04842* (2013.01); *G06F 9/445* (2013.01); *G06F 40/143* (2020.01); *H04L 67/02* (2013.01); *H04L 67/75* (2022.05)

(58) Field of Classification Search
  CPC ...... G06F 9/445; G06F 40/134; G06F 40/143; G06F 3/04842; H04L 67/702; H04L 67/02; H04L 67/75
  See application file for complete search history.

(56) References Cited

U.S. PATENT DOCUMENTS

| | | | |
|---|---|---|---|
| 2008/0195936 A1* | 8/2008 | White | G06F 9/451 715/246 |
| 2009/0157794 A1* | 6/2009 | Sheshadri | G06F 8/61 709/202 |
| 2012/0116873 A1 | 5/2012 | Damm et al. | |
| 2013/0235044 A1 | 9/2013 | Kaleta et al. | |

(Continued)

OTHER PUBLICATIONS

Oct. 12, 2018—U.S. Non-final Office Action—U.S. Appl. No. 15/806,417.

(Continued)

*Primary Examiner* — Asher D Kells

(57) ABSTRACT

Aspects described herein may provide methods and systems for loading a second application from a first application while maintaining a consistent user experience. A technique may comprise receiving, by a client application, a first application from web servers. Upon receipt of a request for a second application, the first application may display a first loading display. The client application and/or the first application may then retrieve the second application and, in the process of retrieving the second application, cause the second application to display a similar loading display. When the client application switches from the first application to the second application, the client may display the second loading display. The similarity of the two loading displays may minimize the interruption perceived by the user. The loading displays may comprise indications of loading status, advertisements, interactive elements, or other content for display to the user.

21 Claims, 4 Drawing Sheets

(56) References Cited

U.S. PATENT DOCUMENTS

| | | | |
|---|---|---|---|
| 2014/0136693 A1* | 5/2014 | Greifeneder | H04L 61/1505 709/224 |
| 2014/0176621 A1* | 6/2014 | Jo | G06F 1/3265 345/690 |
| 2016/0170815 A1* | 6/2016 | Scholz | G06F 9/544 719/312 |
| 2016/0379298 A1* | 12/2016 | Isaacson | G06Q 30/0633 705/26.62 |

OTHER PUBLICATIONS

Feb. 7, 2019—U.S. Final Office Action—U.S. Appl. No. 15/806,417.
Danny Ruijters, Collapsing Multiple Progress Bars, Nov. 15, 2007, pp. 1-3 https://www.codeproject.com/Articles/21219/Collapsing-Multiple-Progress-Bars (Year: 2007).
Oct. 3, 2019—U.S. Notice of Allowance—U.S. Appl. No. 15/806,417.

* cited by examiner

Client (Via First Application) to Web Servers (401)

```
GET /secondapplication HTTP/1.1
Host: www.first-application.com
Location-Loading: www.first-application.com/loading
```

Client (Via First Application) to Web Servers (402)

```
LOADING /loading HTTP/1.1
Host: www.first-application.com
```

Web Servers to Client (403)

```
HTTP/1.1 302 Found
Location: http://www.second-application.com
Location-Loading: www.first-application.com/loading
```

Client to Web Servers (404)

```
GET /secondapplication HTTP/1.1
Host: www.second-application.com?location-loading=www.first-
application.com/loading
```

Client (Via Second Application) to Web Servers (405)

```
LOADING /loading HTTP/1.1
Host: www.first-application.com
```

*FIG. 4*

INTERCEPTED LOADING OF WEB APPLICATIONS

FIELD

Aspects described herein generally relate to computer networking. More specifically, aspects described herein relate to a method of loading web applications to, for example, provide a streamlined user experience.

BACKGROUND

Internet applications and websites continue to increase with complexity and scope. Many applications are now provided as one-page web applications, which leverage conventional web browsers and JavaScript to perform functionality formerly limited to desktop applications and/or static multi-page websites. Current web technology is ill-equipped to handle such complexity because, for example, Internet application users may erroneously believe the delay created by loading a single-page web application from a remote server is an application error. There is thus an ever-present need for methods to optimize the retrieval, loading, and display of Internet content.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein provide an improved method of requesting and retrieving applications, such as web applications.

As described herein, a user may access and use a first application, such as a single-page web application, via a client application, such as a web browser. The user may initiate a request at the first application that may be served by a second application. Because the application is different, a delay in accessing (e.g. downloading and rendering) the second application may be anticipated. In response to recognizing the need for the second application, the client application may first display a loading display in the first application. This loading display may comprise a variety of content elements, including, for example, advertisements, tutorials, or information which may convey to the user that the application is loading. While the loading display is visible, the client application may initialize the second application, wherein such initialization may comprise initializing a second loading display on the second application. While loading the second application, the client application may switch from the first loading display to the second loading display. The second loading display and the first loading display may be the same or substantially similar such that the switch from the first application to the second application is not easily detected by the user. When the second application is fully retrieved, the client application may cease display of the loading display and instead display the second application.

An illustration of this method is provided herein. A user may access an online text chat application (e.g. mytextchat.com) through a web browser. The text chat application may allow users to chat using text, but not through video. The user may select a button in the text chat application which indicates that the user wishes to video chat. The button may direct the user's web browser to mytextchat.com/video; however, that link may ultimately redirect users (e.g. through an Hypertext Transfer Protocol ("HTTP") 302 redirect or the like) to a video chat application (e.g. myvideochat.com) separate from the text chat application. In response to the user's selection of the button, the text chat application may intercept the request for the video chat application and, rather than redirect the user's web browser to the video chat application, instead first retrieve and cause display, on the web browser, of a loading display (e.g. mytextchat.com/loading). This may include creating a Hypertext Markup Language ("HTML") Document Object Model ("DOM") and displaying the loading display within it. Because the loading display may be local to the text chat application, the retrieval and display of the loading display may occur more quickly than redirecting the user's web browser to the video chat application. The text chat application may then request the video chat application by not only requesting the video chat application directly (e.g. by retrieving myvideochat.com), but also by transmitting to the video chat application an indication of the current loading display (e.g. transmitting, in an HTTP header and/or the URL and to the video chat application, mytextchat.com/loading). The video chat application, having received both the request and the indication of the current loading display, may create its own HTML DOM with the same or a similar loading display (e.g. based off of mytextchat.com/loading) and cause it to be displayed by the user's web browser. In this manner, the user may not detect the change in applications, or may only a detect a change in certain portions of the loading display (e.g. a movement in a loading bar or a change in a displayed advertisement). The video chat application may then remove or replace the loading display once it has loaded.

The first application, second application, and client application may use one or more unique protocol headers and/or verbs to exchange information to implement the method described herein. A unique header (e.g. in the HTTP protocol), such as "Location-Loading," may be used to indicate the location of one or more loading displays. This header may be passed amongst the first application, second application, client application, and/or web servers to ensure that the first application and second application display the same or a similar loading display. A "LOADING" command, e.g. a "LOADING" verb in the HTTP protocol, may be used to retrieve a loading display in a manner which does not interrupt retrieval (e.g. via a GET command) of the second application. This verb may allow, for example, a web server to prioritize quick loading of a loading display and to delay requests for content associated with a second application. Such headers and verbs may be used by the first application and second application such that they are not available to the client application in order to maximize compatibility with the widest variety of client applications. Alternatively, the client application may be configured to understand, process, and transmit such unique headers and verbs.

The details of these and other features are set forth in the accompanying drawings and the description below. Other features and advantages will be apparent from the description and drawings, and from the claims.

BRIEF DESCRIPTION OF THE DRAWINGS

These and other features, aspects, and advantages of the present disclosure will become better understood with regard to the following description, claims, and drawings. The present disclosure is illustrated by way of example.

FIG. 4 depicts a series of HTTP/1.1 messages which may be exchanged between the client application and web servers in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
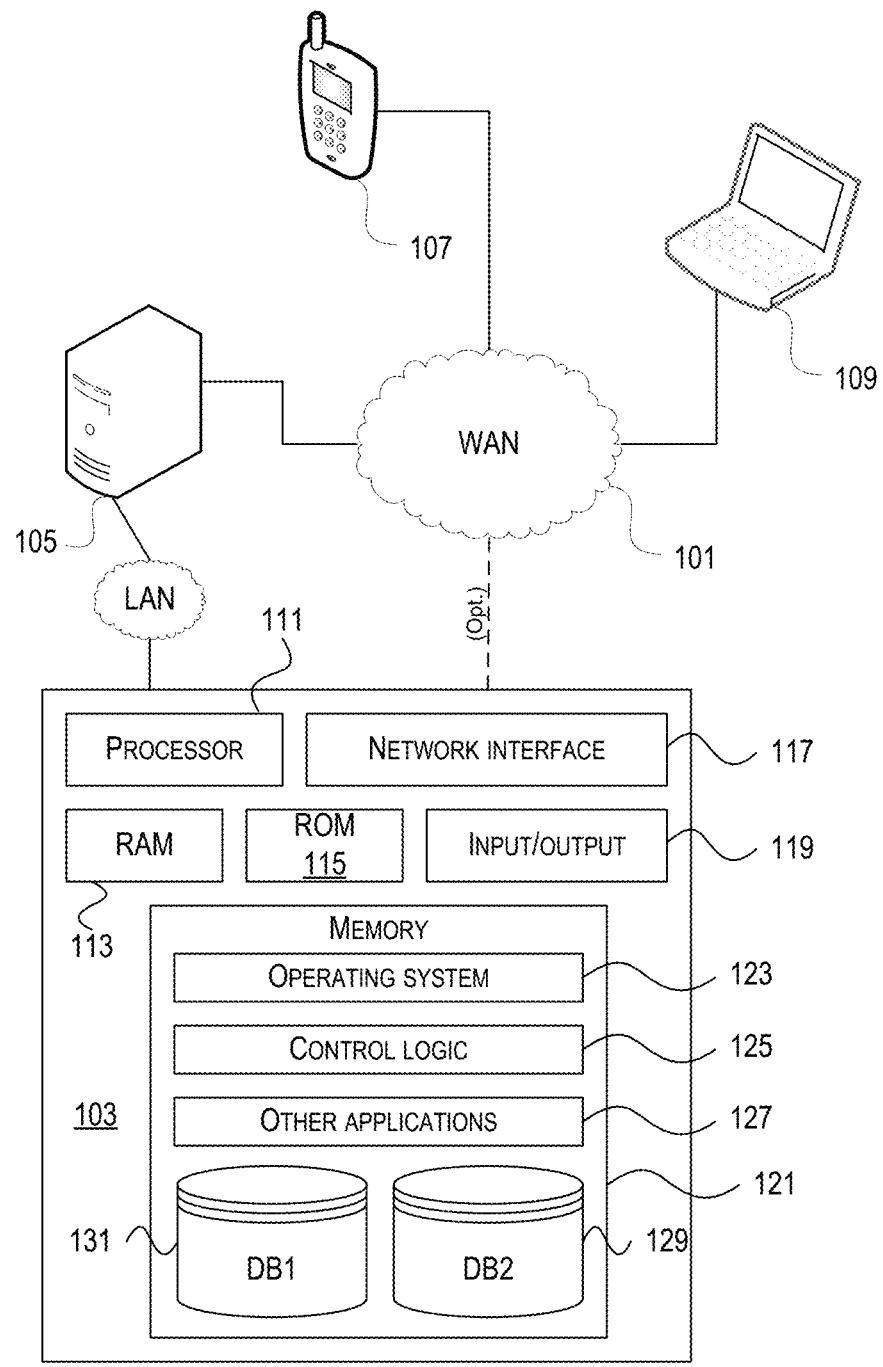
FIG. 1 depicts an illustrative computer system architecture that may be used in accordance with one or more illustrative aspects described herein.

FIG. 1 illustrates one example of a system architecture and data processing device that may be used to implement one or more illustrative aspects described herein in a stand-alone and/or networked environment. In accordance with the disclosure, computer software, hardware, and networks may be utilized in a variety of different system environments, including standalone, networked, remote-access (a/k/a remote desktop), virtualized, and/or cloud-based environments, among others. Various network nodes 103, 105, 107, and 109 may be interconnected via a wide area network ("WAN") 101, such as the Internet. Other networks may also or alternatively be used, including private intranets, corporate networks, local area networks ("LANs"), metropolitan area networks ("MAN") wireless networks, personal networks ("PAN"), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which may be comprised of the data-attributable to a single entity-residing across all physical networks.

The components may include data server 103, web server 105, and client computers 107, 109 (also referred to herein as "user device(s)"). Data server 103 may provide overall access, control and administration of databases and control software for performing one or more illustrative aspects describe herein. Data server 103 may be connected to web server 105, through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107, a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, for example, may include a processor 111 controlling overall operation of data server 103. Data server 103 may further include random access memory (RAM) 113, read only memory ("ROM") 115, network interface 117, input/output interfaces 119 (e.g., keyboard, mouse, display, printer, etc.), and memory 121. Input/output ("I/O") 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 131 and a second database 129. In some embodiments, the first database may include the second database (e.g., as a separate table, report, etc.). That is, the information may be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or Extensible Markup Language ("XML"). The computer-executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays ("FPGA"), and the like. Particular data structures may be used to more effectively implement one or more aspects described herein, and such data structures are contemplated within the scope of computer executable instructions and computer-usable data described herein.

Figure 2:
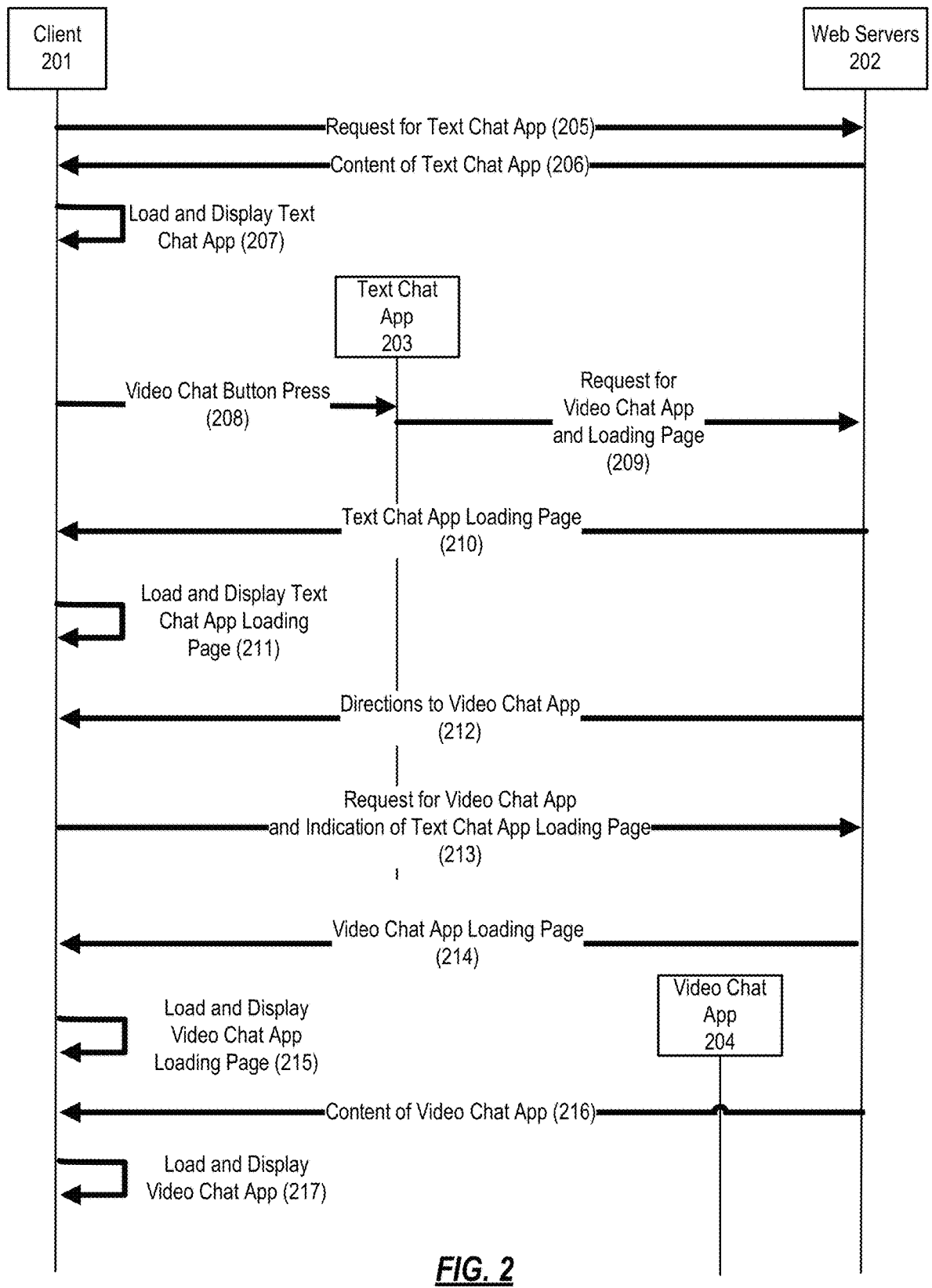
FIG. 2 depicts a message flow diagram illustrating how a client application, web servers, and two applications may communicate in accordance with one or more illustrative aspects described herein.

FIG. 2 depicts an illustrative message flow diagram depicting the disclosures herein.

FIG. 2 depicts a client 201, web servers 202, and a first application 203 and a second application 204. As depicted in FIG. 2, for illustrative purposes, first application 203 is an text chat application, and second application 204 is an video chat application.

Client 201 may be any program executing on a computing device that is capable of executing first application 203 and second application 204. Client 201 may be a web browser, such as the CHROME web browser by Google Inc. of Mountain View, Calif. and the FIREFOX web browser by the Mozilla Corporation of Mountain View, Calif. Client 201 may additionally or alternatively be a wrapper program intended to execute code on web servers 202. For instance, client 201 may be code which enables a computing device to remotely access a highly sensitive applications which reside on web servers 202.

Though FIG. 2 depicts web servers 202 as a single box, web servers 202 may be one or a plurality of computing devices located worldwide. Web servers 202 may comprise a content delivery network. Web servers 202 may be together or may be distributed geographically. First application 203 may be served on one or more first servers and second application 204 may be stored on one or more second servers. For example, a single-page web application may execute based on HTML code on a first server and JavaScript code on a second server and may comprise images retrieved from a content delivery network.

First application 203 and second application 204 may be any computing device applications which may be stored on web servers 202 and executed by client 201. First application 203 and second application 204 may be, for example, single-page web applications. Client 201 may comprise a viewer application, and first application 203 and second application 204 may comprise desktop applications configured to be operated using a viewer application.

First application 203 and second application 204 may be stored in part on web servers 202 and, when retrieved, in part on the computing device executing client 201. The portion of first application 203 and second application 203 retrieved by client 201 may be audiovisual information depicting the application executing on web servers 202, may be raw data which may be processed and displayed by client 201, or the like. For example, web servers 202 executing highly sensitive applications may send client 201 only an encrypted video stream of the highly sensitive applications. As another example, a spreadsheet program executing on web servers 202 may send, to client 201, a stream of tabulated data which may be processed and displayed in a spreadsheet on client 201.

Because first application 203 and second application 204 may be stored in part on client 201 and web servers 202, and as detailed below, requests to and from first application 203 and/or second application 204 may be performed by client 201 or web servers 202.

Discussion will now turn to the flow of messages between client 201, web servers 202, first application 203, and second application 204.

First, in step 205, client 201 sends a request for the first application 203 to web servers 202. This step may comprise the user of the browser visiting a website or opening a smartphone application. The request may be initiated without user intervention. For example, some smartphones are configured to automatically open applications upon receipt of a notification (e.g. opening an text chat application when a message is received).

In step 206, web servers 202 send content corresponding to first application 203 to client 201. For both first application 203 and second application 204, receipt of an application by client 201 need not entail receipt of all code for the application. First application 203 may have a portion of content stored on client 201 and another portion stored at web servers 202. For instance, if first application 203 is a text chat application, client 201 may receive content which enables client 201 to send and receive text messages, but may not provide code allowing client 201 to change user account information. As another example, client 201 may access an HTML chat application using PHP Hypertext Protocol ("PHP") and Asynchronous Java and XML ("AJAX") such that portions of HTML and AJAX content are stored at client 201, but PHP portions of the application are stored at web servers 202.

In step 207, web client 201 may load and display first application 203. With regard to both first application 203 and second application 204, as well as loading displays (discussed later), loading and display may occur in any manner appropriate based on the properties of client 201. Modern web browsers, such as the CHROME web browser by Google of Mountain View, Calif. and the FIREFOX web browser by the Mozilla Corporation of Mountain View, Calif., may, for example, display received content for the first application 203 differently based on screen resolution, whether or not the browsers are executing on a laptop, smartphone, or personal computer, or the like. In the context of web applications, loading and display may entail creating a DOM and loading HTML elements within the DOM. Flexibility in the manner in which first application 203, second application 204, and/or any loading displays (discussed later) are loaded and displayed is desirable because the computing device executing client 201 may vary: a smartphone, for example, may have very different display and input capabilities than a laptop or a television set-top box. Such loading and display process, also in steps 211, 216, and 218, may be the same or different as necessary based on the received content.

In step 208, the user may, using first application 203, initiate a request for second application 204. For instance, as depicted in FIG. 2, a user may request a video chat while using a text chat application, and such video chat functionality may be available on an video chat application but not the text chat application. The request may comprise requesting a Uniform Resource Locator ("URL") associated with first application 203 which ultimately redirects to second application 204. For instance, first application 203 may be associated with the URL mytextchat.com, and second application 204 may be associated with myvideochat.com. The request in step 203 may be made to mytextchat.com/video, a URL which may redirect (e.g. via an HTTP 302 response) to myvideochat.com. The request need not involve a URL at all: client 201 may merely contextually suggest to first application 203 to retrieve second application 204. The request itself may comprise no more than the passage of time: for example, first application 203 may be a premium application accessible for only a first time period, and second application 204 may be a free application accessible for a second, longer time period.

The user of client 201 need not know that the request in step 203 involves second application 204. Indeed, it may be preferable to hide the distinction between first application 203 and second application 204 in order to present a seamless experience to the user. For example, first application 203 and second application 204 may be presented as different sections and/or functions of the same application.

In step 209, client 201 may, via first application 203, request a loading display from web servers 202. First application 203 may be configured to determine certain conditions (e.g. the request from the user in step 208) associated with loading second application 204 that trigger a request for a loading display from web servers 202. The loading display request in step 209 may comprise a request for a specific loading display, such as a request for a loading display associated with second application 204, for a loading display based on client 201, for a loading display based on the user of client 201, or the like. First application 203 may already have some or all of the loading display (e.g. an HTML DOM and Cascading Style Sheet ("CSS") information) such that the request to web servers 202 may comprise a request for additional loading display information (e.g. a request for an advertisement) or for authorization to display the loading display. The request for a loading display may further comprise an indication of second application 204 so that web servers 202 may select or generate a loading display based on second application 204 (e.g. "We're loading your Video Chat App. Please wait . . . "). The request may alternatively or additionally comprise a HTTP verb, such as "LOADING," associated with an indication of a loading display stored at web servers 202.

An illustration of steps 208 and 209 is provided herein for the reader. Step 208 may comprise a user of client 201 clicking a link to go to "mytextchat.com/video." Step 209 may comprise a HTTP-based request to web servers 202 comprising two verbs. First, client 201 and/or first application 203 may transmit to web servers 202 an HTTP "GET" command comprising a URL associated with application B (e.g. "GET mytextchat.com/video") and an HTTP header comprising the loading display intended to be displayed (e.g. "Location-loading: mytextchat.com/loading"). The former URL may be used by web servers 202 to retrieve second application 204; whereas the latter URL may be transmitted, by web servers 202, to second application 204 such that second application 204 may also display the loading display (as described further below). Client 201 and/or first application 203 may then send a "LOADING" verb command comprising the same "Location-loading" URL (e.g. "LOADING mytextchat.com/loading") to web servers 202 in order to request and retrieve, from web servers 202, the content associated with the loading display. Additional discussion relating to such verbs and HTTP headers is provided below in the context of FIG. 4.

In step 210, web servers 202 may transmit to client 201 the loading display. The loading display may be transmitted directly to client 201 or through the first application 203 to client 201. First application 203 may, for example, receive loading display information from web servers 202, modify it (e.g. add CSS style information used by first application 203), and transmit it to client 201. The loading display may be any format which may be displayed by client 201, such as HTML. Step 210 may comprise include transmitting, by web servers 202 and to first application 203, a confirmation indicating that the loading display was received by client 201.

A loading display may comprise any display which may be shown on via client 201. For example, a loading display may be a static image, text (e.g. "Loading . . . "), or one or more content elements.

The loading display received by client 201 from web servers 202 and/or first application 203 may comprise a variety of content elements. Illustrations of such content elements are provided below.

The loading display may comprise one or more indications of load time, such as a loading bar, timer, or the like. Web server 20 and/or first application 203 may estimate how long it will take for second application 204 to load and cause such information to be displayed in such an indication of load time. Similarly, client 201 and web servers 202 may communicate in order to determine a loading status of second application 204. For example, web servers 202 may determine a size of content associated with second application 204 and begin transmitting such content to client 201. Client 201 may, in turn, transmit to web servers 202 an indication of an amount of the content received. In this manner, if a portion of second application 204 is not received correctly and web servers 202 must re-transmit the portion, the indication of load time on the loading display may be revised by client 201, first application 203, and/or web servers 202 for accuracy.

The loading display may comprise one or more advertisements. Such advertisements may be based on first application 203, second application 204, client 201, the user of client 201, or the like. For example, web servers 202 may determine that a PC-based browser is switching from a chat application to an video application and, in turn, display advertisements for a web camera on the loading display. As another example, web servers 202 may determine that a smartphone-based browser is switching from a chat application to a video chat application and, in turn, display advertisements for a new cell phone with a better camera on the loading display.

The loading display may comprise information, such as tutorial text, associated with either first application 203 or second application 204. For instance, a "tip of the day" for using second application 204 may be displayed on the loading display. Notifications originating from first application 203 or second application 204 may additionally or alternatively be displayed. For instance, the loading display may display a list of tasks to be performed in second application 204.

The loading display may also comprise one or more interactive elements which may reduce the perceived length of time the loading display is displayed. Interactive elements may comprise, for example, a game, quiz, user-controllable animation, or the like. While perhaps more computationally and bandwidth-intensive than a static loading display, such interactive elements may serve to lessen the perceived load time of second application 204.

In step 211, client 201 may load and display the received loading display. As with first application 203 in step 207, display of the loading display may be performed in any manner appropriate based on client 201 and the loading display received.

In step 212, web servers 202 may transmit to client 201 directions to second application 204. Web servers 202 may transmit the directions to the second application 204 via first application 203. While the request made in step 205 may comprise merely an indication that second application 204 is requested (e.g. a GET command to URL "firstapplication.com/secondapplication," which may cause a HTTP 302 redirect to "secondapplication.com"), the directions transmitted in step 212 may comprise a more direct indication to second application 204 (e.g. an indication that client 201 should issue a GET command to "secondapplication.com"). In this way, step 205 and 213 may, in conjunction, perform a function similar to that of a HTTP/1.1 302 redirect. The directions transmitted to client 201 may additionally or alternatively cause client 201 to retrieve second application 204 in a manner which simultaneously transmits the loading display associated with first application 203 (e.g. an indication that client 201 should issue a GET command to "secondapplication.com?loadingpage=firstapplication.com/loading").

In step 213, client 201 may, based on the directions received in step 212, transmit a request for second application 204 to web servers 202. Client 201 may transmit this request via first application 203. As indicated above, the request may comprise a HTTP GET command for a URL associated with second application 204. As second application 204 may be stored on a web server different than the web server which stores first application 203, the directions may comprise additional information necessary for client 201 to locate second application 204 (e.g. a series of Internet Protocol ("IP") address hops necessary to locate second application 204). While the request is indicated In FIG. 2 as made by client 201, step 213 may be performed by first application 203.

In step 213, client 201 and/or first application 203 may additionally or alternatively cause second application 204 to receive an indication of the first loading display. This indication may be passed to second application 204 via the URL used by client 201 and/or first application 203 to request second application 204 (e.g. through a GET command by first application 203 to "secondapplication.com?location-loading=firstapplication.com/loading"). In this way, client 201 need not be configured to use a unique HTTP header; rather, it may simply be instructed to visit a URL with special parameters indicating the first loading display. Additionally or alternatively, client 201 and/or first application 203 may transmit a unique command, such as a "Location-loading" HTTP header, to second application 204. In some circumstances (e.g. where compatibility with legacy networking equipment is desired) it may be easier for client 201 to pass the information to second application 204 in a URL parameter, whereas in other circumstances (e.g. circumstances where obfuscating the retrieval of the loading display is desired) it may be preferable for first application 203 to append a "location-loading" header to an HTTP "GET" command directed to second application 204.

In step 214, second application 204 may transmit to client 201 a second loading display. It may be desirable to switch from first application 203 to second application 204 without visibly loading second application 204. As such, the second loading display transmitted by second application 204 may be the same or a similar loading display as that displayed by first application 203 such that, when a switch from first application 203 to second application 204 occurs, the switch is difficult to perceive by the user of client 201. As with the loading display displayed by first application 203, second application 204 may receive loading display information from web servers 202 and modify it before transmitting the second loading display to client 201. And, like the first loading display displayed by first application 203, the second loading display may feature indications of loading status, advertisements, interactive elements, or the like.

In step 215, client 201 may load and display the second loading display received. The loading and retrieval may, but need not, be the same process used in steps 207 and 211. In order to best disguise the switch from a first loading display to a second loading display, the same DOM used by client 201 to display the first loading display may be modified or revised to display the second loading display.

In step 216, web servers 202 may transmit to client 201 content associated with second application 204. As with first application 203, client 201 may only receive a portion of second application 204. If the second loading display displays an indication of loading status, web servers 202 and client 201 may communicate to determine, for example, an estimated loading time. In some embodiments, recognizing that a loading display is displayed at client 201, web servers 202 may send more or less of second application 204 in order to minimize or optimize the inconvenience of the user. For example, web servers 202 may only send a minimal amount of content associated with second application 204 such that the loading display is displayed for as little time as possible. As another example, web servers 202 may send additional content to client 201 such that, since the user is already inconvenienced by the loading time, the additional content may help prevent the need for a future loading display.

Step 216 may be performed before the second loading display is received. Client 201 may retrieve second application 204 while the loading display associated with first application 203 is still displayed. Client 201 may retrieve a first portion of second application 204 while the first loading display is displayed and a second portion of second application 204 while the second loading display is displayed. Client 201 may receive a portion of second application 204 sufficient to display the second loading display, display the second loading display, and then load the remaining portion(s) of second application 204. The particular timing of step 217 in relation to the flow of FIG. 2 may be modified as necessary based on, for example, the protocol which web servers 202 use to communicate with client 201.

In step 217, web browser may load and display the second loading display received. The loading and retrieval may, but need not, be the same process used in steps 207, 211, and 216. For instance, the DOM initialized at client 201 to display a loading display may be entirely deleted and replaced with a DOM corresponding to second application 204.

Figure 3:
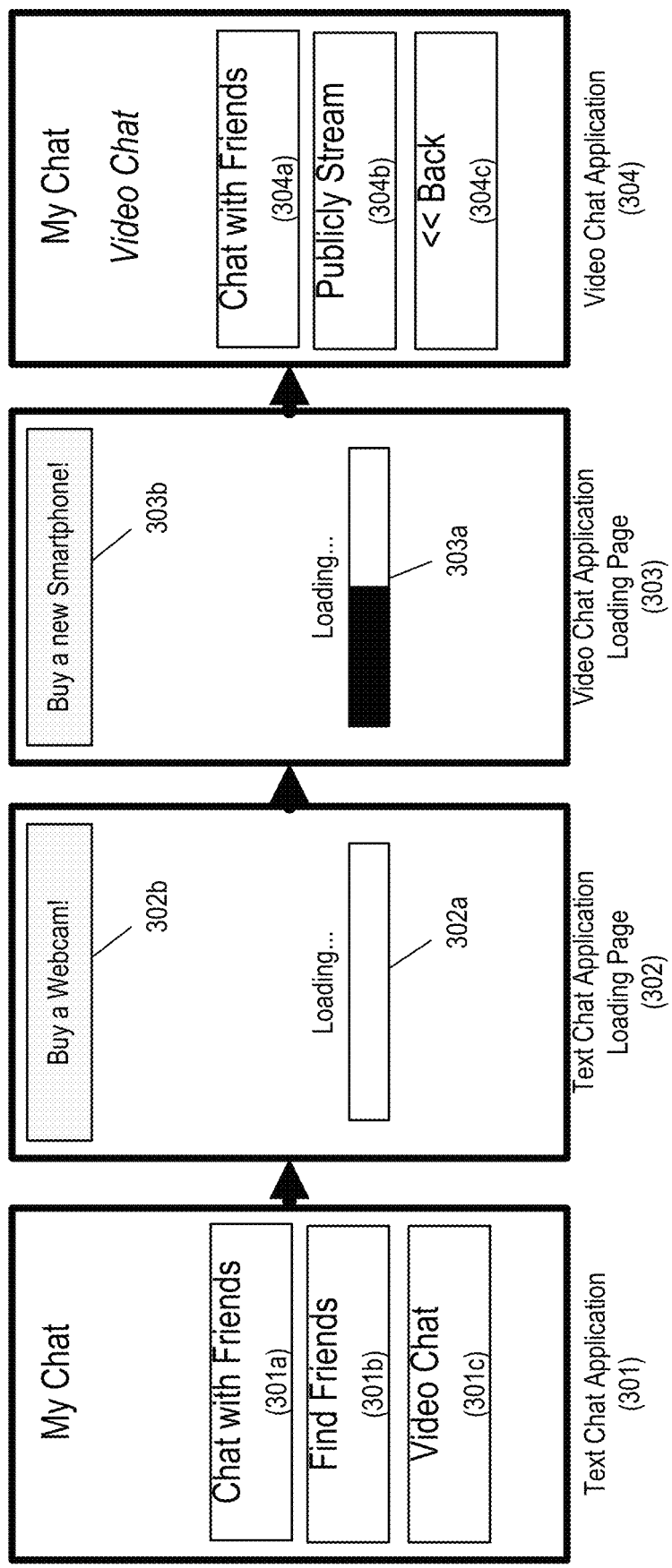
FIG. 3 depicts illustrative screens, including loading displays, from first and second applications in accordance with one or more illustrative aspects described herein.

FIG. 3 is an illustrative series of screens that may be seen on client 201 in accordance with the features described herein. For the purposes of illustration, FIG. 3 depicts applications executing on a smartphone.

Screen 301 displays an illustrative display of a text chat application ("My Chat"). Three buttons are available: a button 301a to "Chat with Friends," a button 301b to "Find Friends," and a button 301c corresponding to an video chat screen.

The text chat application depicted in screen 301 may be capable of displaying the performing the functions associated with buttons 301a and 301b, but not capable of video chat. The video chat screen may be viewed on a second application, depicted in FIG. 3 as an video chat application 304. Such division of applications (e.g. containerization) may be useful to, for example, keep the size of the text chat application low (e.g. so that users may open it quickly to respond to texts).

The user, after selecting button 301c, may first be presented with a loading display 302 in the text chat application. Loading display 302 comprises an empty loading bar 302a and advertisement 302b. Advertisement 302b may be based on any information known about client 201, first application 203, second application 204, or the user of client 201. For instance, FIG. 3 shows an advertisement relating to a web camera because the user has selected the button corresponding to an video chat screen. Loading bar 302a may be static or may fill based on the loading status of the requested video chat application.

Screen 303 depicts the loading display in the video chat application. As described with regards to FIG. 2, the switch from screen 302 to 303 may be made such that loading displays 302 and 303 appear to be a single loading display. Some portions of a loading display may nonetheless change between the loading display associated with the first application and the loading display associated with the second application. As depicted in loading display 303, loading bar 303a, which corresponds to loading bar 302a, has partially filled. Advertisement 303b, which appears in the same area as advertisement 302b, may also change (e.g. from "Buy a Webcam!" to "Buy a new Smartphone!").

Screen 304 depicts a screen from the video chat app. As depicted in FIG. 3, screen 304 from the video chat app appears to be a portion of the text chat application depicted in screen 301. In this way, a user may not know that they have switched applications at all. Screen 304 comprises a button 304a ("Chat with Friends"), a button 304b ("Publicly Stream"), and a "back" button 304c. The "back" button 304c depicted here is in many ways similar to video chat button 301c: pressing the back button would trigger loading displays similar to loading displays 302 and 303 while loading text chat application screen 301.

FIG. 4 depicts a series of illustrative HTTP messages which may be exchanged between client 201 and web servers 202 in accordance with the illustrations described herein.

In message 401, client 201 may transmit, via the first application and to web servers 202, a message which may indicate a request for an video chat page (e.g. "GET/secondapplication HTTP/1.1"). The request is made using the first application (e.g. "Host: www.first-application-.com"). The request further includes a unique HTTP header (e.g. "Location-Loading") which specifies the location of a loading display (e.g. "www.first-application.com/loading"). In the flow depicted in FIG. 2, step 209 may comprise message 401.

In message 402, client 201, via first application 203, may retrieve the loading display. Client 201 uses a unique verb (e.g. "LOADING") to retrieve, in a process which may be similar to an HTTP "GET" command, a loading display (e.g. "/loading"). The verb depicted in FIG. 4 may be used as part of the HTTP/1.1 protocol. As with message 401, message 402 is made using the first application ("Host: www.first-application.com"), and the loading display is located at the first application. In the flow depicted in FIG. 2, step 209 may comprise message 402.

In message 403, and in response to message 401, web servers 202 respond to the request for "www.first-application.com/secondapplication" with a 302 redirect (e.g. "HTTP/1.1 302 Found") to the second application (e.g. "Location: http://www.second-application.com"). As depicted in FIG. 4, this 302 redirect comprises the same "Location-Loading" information provided in message 401. Such information may be passed along servers to ensure that the second application is notified of the loading display being displayed by client 201. In the flow depicted in FIG. 2, step 212 may comprise message 403.

In message 404, and in response to message 403, client 201 may request the video chat page (e.g. "GET/secondapplication HTTP/1.1") of the second application (e.g. "Host: www.second-application.com?location-loading=www.first-application.com/loading").

As depicted in FIG. 4, client 201 may pass the "Location-Loading" information as parameters in a query in the URL, rather than via information in HTTP protocol header fields. This use of parameters in a query in the URL may allow queries to be passed along servers and devices which would otherwise ignore or strip out "Location-Loading" header information included in HTTP protocol header fields. In the flow depicted in FIG. 2, step 213 may comprise message 404.

In message 405, client 201 may, via second application 204, send web servers 202 the same unique verb (e.g. "LOADING") to retrieve the loading display (e.g. "/loading") from first application 203 (e.g. "Host: www.first-application.com"). As depicted in FIG. 4, the content of messages 402 and 405 may be the same and may generate a same or similar loading display, but may be made using different applications. In the flow depicted in FIG. 2, step 214 may comprise message 405.

The verb "LOADING" and header "Location-Loading:" in FIG. 4 are illustrative: client 201 and web servers 202 may exchange such information in a variety of manners. For example, as suggested above, the "Location-Loading" field may be appended to all URLs as a query (e.g. "www.website.com?location-loading:second-website.com"). Similarly, the "LOADING" verb may be a "GET" command with additional functionality which allows client 201 to, via first application 203, retrieve second application 204.

One or more aspects of the disclosure may be embodied in a computer-usable media and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays ("FPGA"), and the like. Particular data structures may be used to more effectively implement one or more aspects of the disclosure, and such data structures are contemplated within the scope of computer executable instructions and computer-usable data described herein.

Aspects of the disclosure have been described in terms of examples. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned examples may be utilized alone or in combination or subcombination with elements of the other examples. For example, any of the above described systems and methods or parts thereof may be combined with the other methods and systems or parts thereof described above. For example, the steps shown in the figures may be performed in other than the recited order, and one or more steps shown may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:
presenting for display a first application accessible via a client device;
rendering a first loading display of the first application in response to a request for a second application, the request being initiated via the first application, and the second application being different than the first application, wherein the first loading display is configured to indicate that the second application is being loaded by the client device by indicating a first amount of the second application that has been loaded by the client device;
receiving a first portion of data of the second application concurrently with display of the first loading display, the first portion of data including a second loading display of the second application, one or more elements of the second loading display being the same as one or more corresponding elements of the first loading display, wherein the second loading display is configured to indicate that the second application is being loaded by the client device by indicating a second amount of the second application that has been loaded by the client device; and
rendering the second loading display of the second application by replacement of the first loading display with the second loading display so as to avoid the appearance of delay while a second portion of data of the second application loads onto the client device from a remote computing device.

2. The method of claim 1, wherein rendering the second loading display includes replacement of the first loading display with the second loading display on a display of the client device.

3. The method of claim 1, wherein the second loading display is presented within the second application.

4. The method of claim 1, wherein the first portion of data is received using a web browser of the client device.

5. The method of claim 4, wherein presentation of the first application includes display of the first application via the web browser.

6. The method of claim 1, wherein at least a portion of the first loading display and at least a portion of the second loading display are the same.

7. The method of claim 1, further comprising:
receiving the request for the second application, wherein the request for the second application comprises an indication of the first loading display.

8. The method of claim 1, wherein rendering the first loading display comprises rendering the first loading display in a document object model of a web browser application, and wherein rendering the second loading display comprises rendering the second loading display in the document object model.

9. The method of claim 1, wherein the first portion of data indicates that one or more elements of the second loading display are the same as one or more corresponding elements of the first loading display.

10. A computing device comprising:
one or more processors; and
memory storing instructions that, when executed by the one or more processors, cause the computing device to:
present for display a first application;
render a first loading display of the first application in response to a request for a second application, the request being initiated via the first application, and the second application being different than the first application, wherein the first loading display is configured to indicate that the second application is being loaded by the computing device by indicating a first amount of the second application that has been loaded by the computing device;
receive a first portion of data of the second application concurrently with display of the first loading display, the first portion of data including a second loading display of the second application, one or more elements of the second loading display being the same as one or more corresponding elements of the first loading display, wherein the second loading display is configured to indicate that the second application is being loaded by the computing device by indicating a second amount of the second application that has been loaded by the computing device; and
render the second loading display of the second application by replacement of the first loading display with the second loading display so as to avoid the appearance of delay while a second portion of data of the second application loads onto the computing device from a remote computing device.

11. The computing device of claim 10, wherein the instructions, when executed by the one or more processors, cause the computing device to render the second loading display by replacing the first loading display with the second loading display on a display of the computing device.

12. The computing device of claim 10, wherein the instructions, when executed by the one or more processors, cause the computing device to render the second loading display by presenting the second loading display within the second application.

13. The computing device of claim 10, wherein the instructions, when executed by the one or more processors, cause the computing device to receive the first portion of data using a web browser of the computing device.

14. The computing device of claim 10, wherein the first loading display is based on properties of the computing device.

15. The computing device of claim 10, wherein the first loading display comprises a first progress bar that is shorter than a second progress bar, and wherein the second loading display comprises the second progress bar.

16. The computing device of claim 10, wherein the instructions, when executed by the one or more processors, cause the computing device to:
   receive the request for the second application, wherein the request for the second application comprises an indication of the first loading display.

17. The computing device of claim 10, wherein the instructions, when executed by the one or more processors, cause the computing device to render the first loading display by rendering the first loading display in a document object model of a web browser application, and wherein the instructions, when executed by the one or more processors, cause the computing device to render the second loading display by rendering the second loading display in the document object model.

18. One or more non-transitory computer-readable medium storing instructions that, when executed, cause:
   presenting for display a first application accessible via a client device;
   rendering a first loading display of the first application in response to a request for a second application, the request being initiated via the first application, and the second application being different than the first application, wherein the first loading display is configured to indicate that the second application is being loaded by the client device by indicating a first amount of the second application that has been loaded by the client device;

receiving a first portion of data of the second application concurrently with display of the first loading display, the first portion of data including a second loading display of the second application, one or more elements of the second loading display being the same as one or more corresponding elements of the first loading display, wherein the second loading, display is configured to indicate that the second application is being, loaded by the client device by indicating a second amount of the second application that has been loaded by the client device; and rendering the second loading display of the second application by replacement of the first loading display with the second loading display so as to avoid the appearance of delay while a second portion of data of the second application loads onto the client device from a remote computing device.

19. The non-transitory computer-readable medium of claim 18, wherein the instructions, when executed, cause rendering of the second loading display by causing replacement of the first loading display with the second loading display on a display of the client device.

20. The non-transitory computer-readable medium of claim 18, wherein the second loading display is presented within the second application.

21. The non-transitory computer-readable medium of claim 18, wherein the first portion of data is received using a web browser of the client device.

\* \* \* \* \*